United States Patent
Hur et al.

(10) Patent No.: US 12,181,559 B2
(45) Date of Patent: Dec. 31, 2024

(54) ELECTRONIC DEVICES WITH ANGULAR LOCATION DETECTION CAPABILITIES

(71) Applicant: Apple Inc., Cupertino, CA (US)

(72) Inventors: Joonhoi Hur, Sunnyvale, CA (US); Andreas Menkhoff, Oberhaching (DE); Bernhard Sogl, Unterhaching (DE); Jochen Schrattenecker, Alberndorf in der Riedmark (AT); Rastislav Vazny, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 766 days.

(21) Appl. No.: 17/331,504

(22) Filed: May 26, 2021

(65) Prior Publication Data

US 2022/0381895 A1 Dec. 1, 2022

(51) Int. Cl.
*G01S 13/42* (2006.01)
*H01Q 3/34* (2006.01)

(52) U.S. Cl.
CPC ............. *G01S 13/426* (2013.01); *H01Q 3/34* (2013.01)

(58) Field of Classification Search
None
See application file for complete search history.

(56) References Cited

U.S. PATENT DOCUMENTS

| | | | |
|---|---|---|---|
| 8,781,420 B2 | 7/2014 | Schlub et al. | |
| 10,572,024 B1* | 2/2020 | Saba | ....................... G01S 15/88 |
| 10,826,177 B2 | 11/2020 | Mow et al. | |
| 10,931,013 B2 | 2/2021 | Cooper et al. | |
| 2017/0184450 A1* | 6/2017 | Doylend | ............... G01S 7/4817 |
| 2020/0319302 A1* | 10/2020 | Nanzer | ............... G01S 13/4454 |
| 2021/0133399 A1* | 5/2021 | Coelho De Souza | ....................... G06F 3/04883 |
| 2022/0179059 A1* | 6/2022 | Krogstad | .............. G01S 13/536 |
| 2023/0083550 A1* | 3/2023 | Sambhwani | ............ G01S 7/003 342/146 |

* cited by examiner

*Primary Examiner* — Whitney Moore
(74) *Attorney, Agent, or Firm* — Treyz Law Group, P.C.; Michael H. Lyons

(57) ABSTRACT

An electronic device may include wireless circuitry having a set of two or more antennas coupled to voltage standing wave ratio (VSWR) sensors. The VSWR sensors may gather VSWR measurements from radio-frequency signals transmitted using the set of antennas. The antennas may be disposed on one or more substrates and/or may be formed from conductive portions of a housing. Control circuitry may process the VSWR measurements to identify the ranges between each of the antennas in the set of antennas and an external object. The control circuitry may process the ranges to identify an angular location of the external object with respect to the device. The control circuitry may adjust subsequent communications based, adjust the direction of a signal beam produced by a phased antenna array, identify a user input, or perform any other desired operations based on the angular location.

16 Claims, 10 Drawing Sheets

ELECTRONIC DEVICES WITH ANGULAR LOCATION DETECTION CAPABILITIES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is sometimes used to perform spatial ranging operations in which radio-frequency signals are used to estimate a distance between the electronic device and external objects.

It can be challenging to provide wireless circuitry that accurately estimates this distance. For example, the wireless circuitry will often exhibit a blind spot near the device within which the wireless circuitry is unable to accurately detect the presence of external objects. In addition, it can be difficult for the wireless circuitry to fully characterize the location and orientation of external objects when present within the blind spot.

SUMMARY

An electronic device may include wireless circuitry controlled by one or more processors. The wireless circuitry may include a set of two or more antennas communicably coupled to voltage standing wave ratio (VSWR) sensors. The VSWR sensors may gather VSWR measurements from radio-frequency signals transmitted using the set of antennas. The antennas in the set of antennas may be disposed on one or more substrates and/or may be formed from conductive portions of a housing for the device. One or more processors may process the VSWR measurements to identify the ranges between each of the antennas in the set of antennas and an external object at, adjacent, or proximate to the set of antennas. The one or more processors may process the ranges to identify an angular location of the external object with respect to the device.

The one or more processors may perform any desired operations based on the identified angular location. For example, the one or more processors may adjust subsequent communications by one or more of the antennas based on the angular location (e.g., by reducing a maximum transmit power level of one or more of the antennas). If desired, the one or more processors may adjust the direction of a signal beam produced by a phased antenna array based on the angular location (e.g., to steer the signal beam around the external object). As another example, the one or more processors may identify a user input or gesture based on the angular location.

An aspect of the disclosure provides an electronic device operable in an environment that includes an external object. The electronic device can include a first antenna and a second antenna. The electronic device can include a first voltage standing wave ratio (VSWR) sensor communicably coupled to the first antenna. The first VSWR sensor can be configured to perform a first VSWR measurement using radio-frequency signals transmitted by the first antenna. The electronic device can include a second VSWR sensor communicably coupled to the second antenna. The second VSWR sensor can be configured to perform a second VSWR measurement using radio-frequency signals transmitted by the second antenna. The electronic device can include one or more processors. The one or more processors can be configured to identify a first range from the first antenna to the external object based on the first VSWR measurement. The one or more processors can be configured to identify a second range from the second antenna to the external object based on the second VSWR measurement. The one or more processors can be configured to identify an angular location of the external object based at least on the first range and the second range.

An aspect of the disclosure provides a method for operating an electronic device having a set of antennas, at least one voltage standing wave ratio (VSWR) sensor communicably coupled to the set of antennas, and one or more processors. The set of antennas can include at least two antennas. The method can include with the set of antennas, transmitting radio-frequency signals. The method can include with the at least one VSWR sensor, gathering VSWR measurements from the radio-frequency signals transmitted by different antennas in the set of antennas. The method can include with the one or more processors, identifying a plurality of ranges between the set of antennas and the external object based on the VSWR measurements. The method can include with the one or more processors, identifying an angular location of the external object based on the plurality of ranges between the set of antennas and the external object.

An aspect of the disclosure provides a method of operating an electronic device in an environment having an external object. The method can include with a first antenna on the electronic device, transmitting first radio-frequency signals. The method can include with a second antenna on the electronic device, transmitting second radio-frequency signals. The method can include with a first voltage standing wave ratio (VSWR) sensor communicably coupled to the first antenna, gathering a first VSWR measurement using the first radio-frequency signals transmitted using the first antenna. The method can include with a second VSWR sensor communicably coupled to the second antenna, gathering a second VSWR measurement using the second radio-frequency signals transmitted using the second antenna. The method can include with one or more processors, identifying an angular location of the external object based at least on the first VSWR measurement and the second VSWR measurement. The method can include with the one or more processors, adjusting a subsequent transmission by the first antenna based at least on the angular location of the external object.

DETAILED DESCRIPTION

Figure 1:
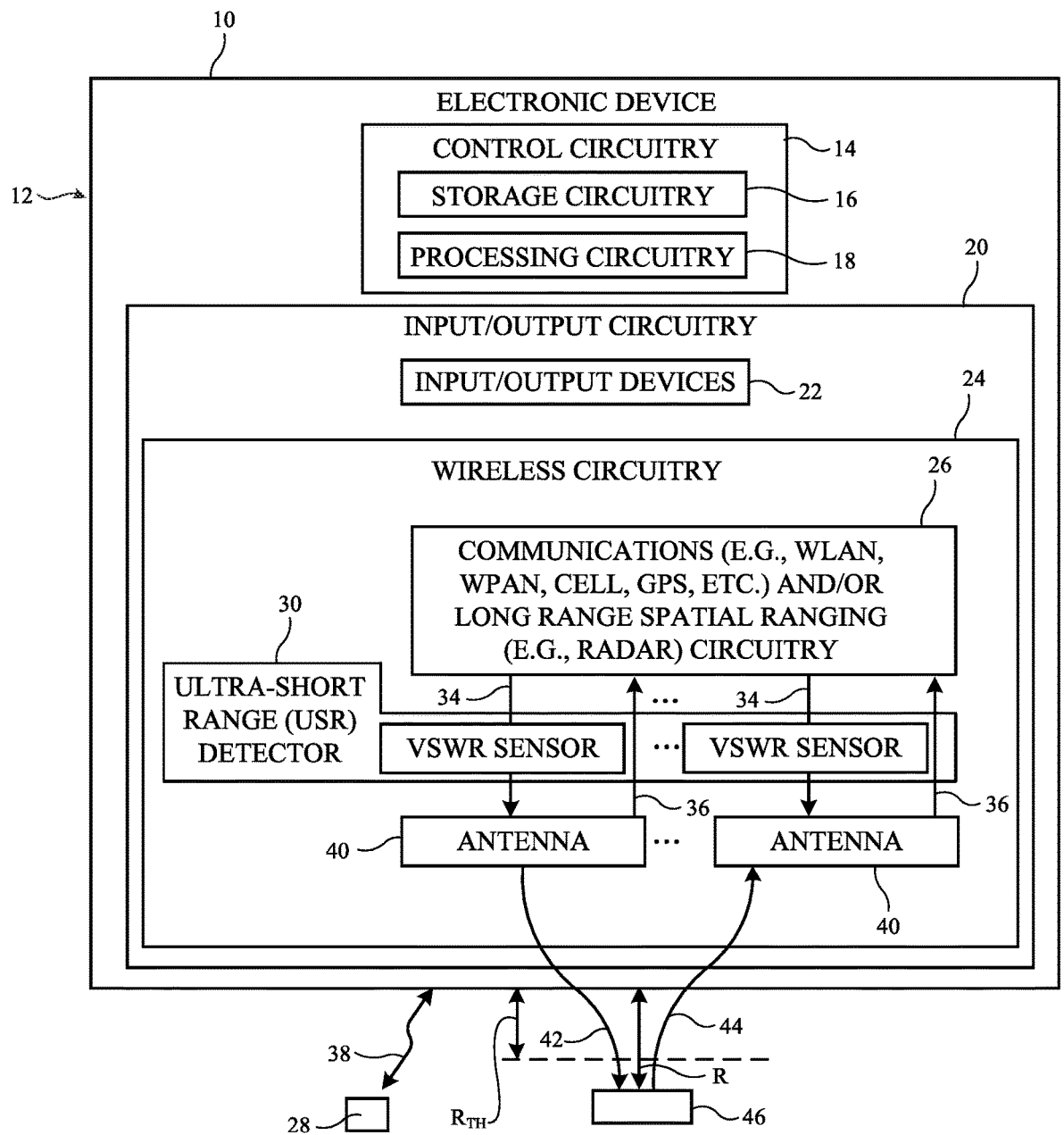
FIG. 1 is a functional block diagram of an illustrative electronic device having voltage standing wave ratio (VSWR) sensors for detecting the angular location of an external object in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18. If desired, portions of storage circuitry 16 may be located on processing circuitry 18 (e.g., as L1 and L2 cache), whereas other portions of storage circuitry 16 are located external to processing circuitry 18 (e.g., while remaining accessible to processing circuitry 18 via a memory interface).

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, temperature sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include two or more antennas 40. Wireless circuitry 24 may also include baseband processor circuitry, transceiver circuitry, amplifier circuitry, filter circuitry, switching circuitry, analog-to-digital converter (ADC) circuitry, digital-to-analog converter (DAC) circuitry, radio-frequency transmission lines, and/or any other circuitry for transmitting and/or receiving radio-frequency signals using antennas 40.

Antennas 40 may be formed using any desired antenna structures. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 40 over time.

Wireless circuitry 24 may use antennas 40 to transmit and/or receive radio-frequency signals 38 to convey wireless communications data between device 10 and external wireless communications equipment 28 (e.g., one or more other devices such as device 10, a wireless access point or base station, etc.). Wireless communications data may be conveyed by wireless circuitry 24 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Wireless circuitry 24 may include communications and/or long range spatial ranging circuitry 26 (sometimes referred to herein simply as communications circuitry 26). Communications circuitry 26 may transmit and/or receive wireless communications data using antennas 40. Communications circuitry 26 may include baseband circuitry (e.g., one or more baseband processors) and one or more radios (e.g., radios having radio-frequency transceivers, modems, synthesizers, switches, filters, mixers, ADCs, DACs, amplifiers, etc.) for conveying radio-frequency signals 38 using one or more antennas 40.

Communications circuitry 26 may transmit and/or receive radio-frequency signals 38 within a corresponding frequency band at radio frequencies (sometimes referred to herein as a communications band or simply as a "band"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Communications circuitry 26 may be coupled to antennas 40 using one or more transmit paths 34 and/or one or more receive paths 36. Communications circuitry 26 may uses transmit paths 34 to transmit radio-frequency signals 38 and may use receive paths 36 to receive radio-frequency signals 38. Transmit paths 34 (sometimes referred to herein as transmit chains 34) may include one or more signal paths (e.g., radio-frequency transmission lines), amplifier circuitry, filter circuitry, switching circuitry, radio-frequency front end circuitry (e.g., components on a radio-frequency front end module), and/or any other desired paths or circuitry for transmitting radio-frequency signals from communications circuitry 26 to antenna(s) 40. Receive paths 36 may include one or more signal paths (e.g., radio-frequency transmission lines), amplifier circuitry (e.g., low noise amplifier (LNA) circuitry), filter circuitry, switching circuitry, radio-frequency front end circuitry (e.g., components on a radio-frequency front end module), and/or any other desired paths or circuitry for conveying radio-frequency signals from antenna(s) 40 to communications circuitry 26.

In addition to conveying wireless communications data, communications circuitry 26 may additionally or alternatively use antennas 40 to perform long range spatial ranging operations. Communications circuitry 26 may include long range spatial ranging circuitry for performing long range spatial ranging operations. The long range spatial ranging circuitry in communications circuitry 26 may include mixer circuitry, amplifier circuitry, transmitter circuitry (e.g., signal generators, synthesizers, etc.), receiver circuitry, filter circuitry, baseband circuitry, ADC circuitry, DAC circuitry, and/or any other desired components used in performing spatial ranging operations using antennas 40. The long range spatial ranging circuitry may include, for example, radar circuitry (e.g., frequency modulated continuous wave (FMCW) radar circuitry, OFDM radar circuitry, FSCW radar circuitry, a phase coded radar circuitry, other types of radar circuitry). Antennas 40 may include separate antennas for conveying wireless communications data and radio-frequency signals for spatial ranging or may include one or more antennas 40 that are used to both convey wireless communications data and to perform spatial ranging. Using a single antenna 40 to both convey wireless communications data and perform spatial ranging may, for example, serve to minimize the amount of space occupied in device 10 by antennas 40.

When performing long range spatial ranging operations, the long range spatial ranging circuitry in communications circuitry 26 may use a first antenna 40 (e.g., a transmit antenna) to transmit radio-frequency signals 42. Radio-frequency signals 42 may include one or more signal tones, continuous waves of radio-frequency energy, wideband signals, chirp signals, or any other desired transmit signals (e.g., radar signals) for use in spatial ranging operations. Unlike radio-frequency signals 38, radio-frequency signals 42 may be free from wireless communications data (e.g., cellular communications data packets, WLAN communications data packets, etc.). Radio-frequency signals 42 may sometimes also be referred to herein as spatial ranging signals 42, long range spatial ranging signals 42, or radar signals 42. The long range spatial ranging circuitry in communications circuitry 26 may transmit radio-frequency signals 42 at one or more carrier frequencies in a corresponding radio frequency band such (e.g., a frequency band that includes frequencies greater than around 10 GHz, greater than around 20 GHz, less than 10 GHz, 20-30 GHz, greater than 40 GHz, etc.).

Radio-frequency signals 42 may reflect off of objects external to device 10 such as external object 46. External object 46 may be, for example, the ground, a building, part of a building, a wall, furniture, a ceiling, a person, a body part, an animal, a vehicle, a landscape or geographic feature, an obstacle, external communications equipment such as external wireless communications equipment 28, another device of the same type as device 10 or a peripheral device such as a gaming controller or remote control, or any other physical object or entity that is external to device 10. A second antenna 40 (e.g., a receive antenna) in wireless circuitry 24 may receive reflected radio-frequency signals 44. Reflected signals 44 may be a reflected version of the transmitted radio-frequency signals 42 that have reflected off of external object 46 and back towards device 10.

The long range spatial ranging circuitry in communications circuitry 26 may receive reflected signals 44 from the second antenna 40 via a corresponding receive path 36. Control circuitry 14 may process the transmitted radio-frequency signals 42 and the received reflected signals 44 to detect or estimate the range R between device 10 and external object 46. If desired, control circuitry 14 may also process the transmitted and received signals to identify a two or three-dimensional spatial location (position) of external object 46, a velocity of external object 46, and/or an angle of arrival of reflected signals 44. If desired, a loopback path may be coupled between the transmit path 34 and the receive path 36 used by the long range spatial ranging circuitry. The loopback path may be used to convey transmit signals on the transmit path to receiver circuitry in the long range spatial ranging circuitry. As an example, in embodiments where the long range spatial ranging circuitry performs spatial ranging using an FMCW scheme, the loopback path may be a de-chirp path that conveys chirp signals on the transmit path to a de-chirp mixer in the long range spatial ranging circuitry. In these embodiments, doppler shifts in continuous wave transmit signals may be detected and processed to identify the velocity of external object 46, and the time dependent frequency difference between radio-frequency signals 42 and reflected signals 44 may be detected and processed to identify range R and/or the position of external object 46. Use of continuous wave signals for estimating range R may allow control circuitry 14 to reliably distinguish between external object 46 and other background or slower-moving objects, for example. This example is merely illustrative and, in general, the long range spatial ranging circuitry may implement any desired radar or long range spatial ranging scheme.

The radio-frequency transmission lines in transmit paths 34 and receive paths 36 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device may be integrated into rigid and/or flexible printed circuit boards if desired. One or more radio-frequency lines may be shared between transmit path(s) 34 and receive path(s) 36 if desired. The components of wireless circuitry 24 may be formed on one or more common substrates or modules (e.g., rigid printed circuit boards, flexible printed circuit boards, integrated circuits, chips, packages, systems-on-chip, etc.).

The example of FIG. 1 is merely illustrative. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, some or all of the baseband circuitry in communications circuitry 26 may form a part of control circuitry 14. The baseband processor circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24. In addition, wireless circuitry 24 may include any desired number of antennas 40. Each antenna 40 may be coupled to communications circuitry 26 over dedicated transmit and/or receive paths or over one or more transmit and/or receive paths that are shared between antennas. Communications circuitry 26 may convey wireless communications data without performing spatial ranging operations (e.g., the long range spatial ranging circuitry in communications circuitry 26 may be omitted) or communications circuitry 26 may perform spatial ranging operations without conveying wireless communications data.

The long range spatial ranging circuitry in communications circuitry 26 may be used to accurately identify range R when external object 46 is at relatively far distances from device 10. However, in practice, the long range spatial ranging circuitry exhibits a blind spot to nearby external objects at distances less than threshold range $R_{TH}$ (e.g., around 1-2 cm) from device 10. When external object 46 is located within this blind spot (e.g., within threshold range $R_{TH}$ from transmit antenna 40TX), the long range spatial ranging circuitry may be unable to identify the presence, location, and/or velocity of external object 46 with a satisfactory level of accuracy. External objects 46 within threshold range $R_{TH}$ of antenna(s) 40 may be exposed to relatively high amounts of radio-frequency energy (e.g., from the radio-frequency signals 38 and/or 42 that are transmitted by antenna(s) 40). In scenarios where external object 46 is a body part or person, if care is not taken, this transmitted radio-frequency energy may cause wireless circuitry 24 to exceed regulatory limits or other limits on specific absorption rate (SAR) (e.g., when the transmitted signals are at frequencies below 6 GHz) and/or maximum permissible exposure (MPE) (e.g., when the transmitted signals are at frequencies above 6 GHz). In order to detect the presence of external object 46 within threshold range $R_{TH}$ from antenna(s) 40, wireless circuitry 24 may include an ultra-short range (USR) object detector such as USR detector 30. USR detector 30 may serve to detect external object 46 at ultra-short ranges (e.g., at ranges within threshold range $R_{TH}$ from antenna(s) 40). In other words, USR detector 30 may perform external object detection within the blind spot of the long range spatial ranging circuitry in communications circuitry 26.

USR detector 30 may include two or more voltage standing wave ratio (VSWR) sensors (detectors) such as VSWR sensors 32. Each VSWR sensor 32 may be interposed on a respective transmit path 34. Each VSWR sensor 32 may gather VSWR values using the antenna 40 coupled to its respective transmit path 34. The VSWR values may include complex scattering parameter values (S-parameter values) such as reflection coefficient (return loss) values (e.g., $S_{11}$ values). The magnitude of the $S_{11}$ values (e.g., $|S_{11}|$ values) may be indicative of the amount of transmitted radio-frequency energy that is reflected in a reverse direction along the transmit path (e.g., in response to the presence of external object 46 at or adjacent to the corresponding antenna 40). The VSWR values gathered by each VSWR sensor 32 may be insensitive to situations where external object 46 is located at distances greater than threshold range $R_{TH}$ from antenna(s) 40. However, the VSWR values gathered by VSWR sensors 32 may allow control circuitry 14 to identify when external object 46 is located within threshold range $R_{TH}$ from two or more of the antennas 40 in wireless circuitry 24 (e.g., within the blind spot of the long range spatial ranging circuitry in communications circuitry 26).

In this way, USR detector 30 and the long range spatial ranging circuitry may identify the presence of external object 46 and optionally the range R to external object 46, regardless of whether external object 46 has moved to a position that is relatively close or relatively far from device 10 over time. In addition, USR detector 30 may identify the presence of external object 46 within the blind spot of the long range spatial ranging circuitry in communications circuitry 26 so that suitable action can be taken to ensure that wireless circuitry 24 continues to satisfy any applicable SAR and/or MPE regulations. By using the same antenna(s) 40 to both transmit radio-frequency signals 38/42 and measure VSWR, the VSWR measurements will be very closely correlated with the amount of radio-frequency energy absorbed by external object 46 from the transmitted radio-frequency signals 38/42, thereby providing high confidence in the use of USR detector 30 for meeting any applicable SAR and/or MPE regulations (e.g., greater confidence than in scenarios where proximity sensors that are separate from the transmit antenna or transmit chain are used to identify the presence of external objects within threshold range $R_{TH}$ of device 10).

In the example of FIG. 1, two antennas 40 are illustrated as being communicable coupled to respective VSWR sensors 32 in USR detector 30. In general, a set of any desired number N of two or more antennas 40 may be communicably coupled to a respective VSWR sensor 32 (e.g., VSWR sensors 32 may be disposed/interposed on any desired number of two or more of the transmit paths 34 in wireless circuitry 24). All of the antennas 40 may have a corresponding VSWR sensor 32 or only a subset of the antennas 40 may have a corresponding VSWR sensor 32. By using more than one antenna 40 to gather (perform) VSWR measurements, control circuitry 14 may process the VSWR measurements to identify the range R between external object 46 and each antenna 40 having a VSWR sensor 32. Control circuitry 14 may process the range R between external object 46 and each of the antennas 40 having a VSWR sensor 32 to identify the location (e.g., the angular location) of external object 46 relative to a surface of device 10. Control circuitry 14 may use the identified angular location of external object 46 to perform any desired processing tasks, such as to perform beam steering using a phased antenna array of antennas 40 (e.g., to steer around external object 46), to identify a user input or gesture corresponding to the angular location of external object 46, to adjust the maximum transmit power level for one or more antennas 40, etc.

Figure 2:
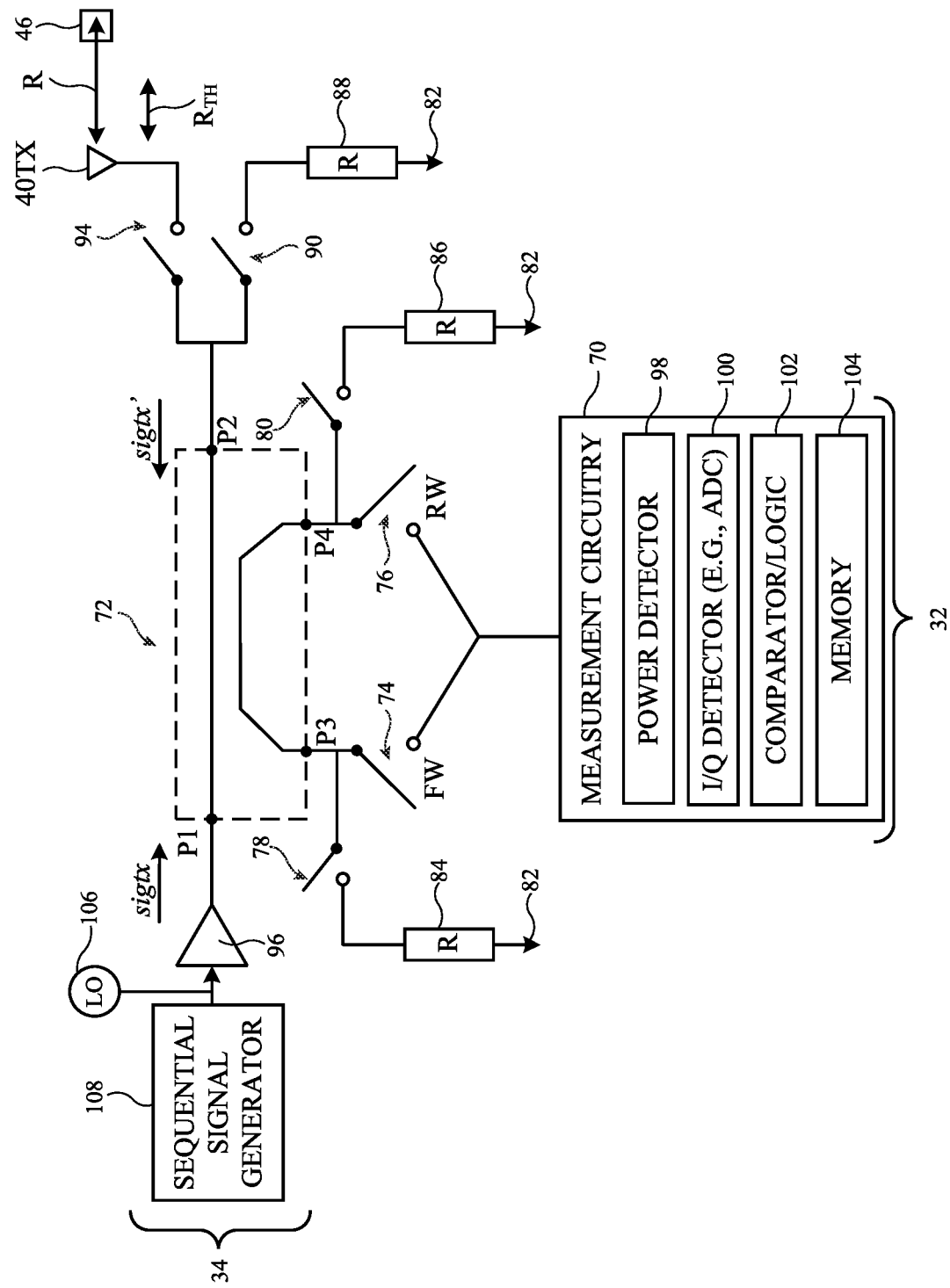
FIG. 2 is a circuit diagram of an illustrative VSWR sensor having a directional coupler for detecting the range between an external object and an antenna in accordance with some embodiments.

FIG. 2 is a circuit diagram of one of the VSWR sensors 32 in wireless circuitry 24 disposed on a corresponding transmit path 34. As shown in FIG. 2, transmit path 34 may include a power amplifier (PA) such as PA 96. The input of PA 96 may be coupled to communications circuitry 26 of FIG. 1. The output of PA 96 may be coupled to a corresponding antenna 40 via a switch such as antenna switch 94. The output of PA 96 may also be coupled to matched load 88 via a switch such as matched load switch 90. Matched load 88 may be coupled in series between matched load switch 90 and ground 82. Matched load 88, matched load switch 90, and/or antenna switch 94 may be omitted if desired.

In the example of FIG. 2, VSWR sensor 32 is a directional switch coupler. This is merely illustrative and, in general, VSWR sensor 32 may be implemented using any desired VSWR sensor architecture. As shown in FIG. 2, VSWR sensor 32 may include directional coupler 72 interposed on transmit path 34 between PA 96 and antenna 40 (e.g., along a radio-frequency transmission line in transmit path 34 coupled between the output of PA 96 and antenna 40). Directional coupler 72 may have a first port (P1) coupled to the output of PA 96 and a second port (P2) communicably coupled to antenna 40. Directional coupler 72 may have a third port (P3) coupled to a first termination that includes resistor 84 coupled in series between termination switch 78 and ground 82. Directional coupler 72 may also have a fourth port (P4) coupled to a second termination that includes resistor 86 coupled in series between termination switch 80 and ground 82. VSWR sensor 32 may have a forward (FW) switch 74 coupled between port P3 and measurement circuitry 70 (e.g., an amplitude and/or phase detector). VSWR sensor 32 may also have a reverse (RW) switch 76 coupled between port P4 and measurement circuitry 70.

Measurement circuitry 70 may have a control path coupled to other components in USR detector 30 or control circuitry 14 (FIG. 1) and/or some or all of measurement circuitry 70 may form a part of control circuitry 14 (e.g., the operations of some or all of measurement circuitry 70 may be performed using one or more processors). Measurement circuitry 70 may include, for example, a power detector such as power detector 98, an in-phase and quadrature-phase (I/Q) detector (e.g., an ADC), logic such as comparator/logic 102 (e.g., one or more logic gates, etc.), and/or memory such as memory 104. Memory 104 may form a part of storage circuitry 16 of FIG. 1, for example. If desired, I/Q detector 100 may be formed from one or more ADCs in one of the receive paths 36 of wireless circuitry 24 (FIG. 1).

When gathering (performing) VSWR measurements (e.g., S-parameter values such as $S_{11}$ values), PA 96 may output a transmit test signal sigtx (e.g., while antenna switch 94 is closed). Test signal sigtx may be a radar transmit signal transmitted by long range spatial ranging circuitry in communications circuitry 26 (e.g., radio-frequency signals 42 of FIG. 1), a wireless communications data transmit signal transmitted by communications circuitry 26 (e.g., radio-frequency signals 38 of FIG. 1), or a dedicated test signal for use in VSWR measurement (e.g., one or more tones transmitted by a signal generator, local oscillator, and/or other signal generation circuitry in USR detector 30 of FIG. 1). For example, a sequential signal generator 108 may be used to generate test signal sigtx. Sequential signal generator 108 may be a part of the long range spatial ranging circuitry in communications circuitry 26 (e.g., test signal sigtx may be a continuous wave or wideband that can also be used in performing long range spatial ranging operations), may be a part of a transceiver in communications circuitry 26 that transmits wireless communications data (e.g., test signal sigtx may also carry wireless communications data), or may be formed as a part of USR detector 30 that is separate from communications circuitry 26. Additionally or alternatively, a simple local oscillator such as local oscillator (LO) 106 may generate test signal sigtx.

In performing VSWR measurements, VSWR sensor 32 may perform forward path measurements and reverse path measurements using transmit signal sigtx. When performing forward path measurements, FW switch 74 is closed, RW switch 76 is open, switch 80 is closed, and switch 78 is open so that test signal sigtx is coupled off from transmit path 34 by directional coupler 72 and routed to measurement circuitry 70 through FW switch 74. Measurement circuitry 70 may measure and store the amplitude (magnitude) and/or phase of test signal sigtx for further processing (e.g., as a forward signal phase and magnitude measurement). For example, power detector 98 (e.g., a peak detector, diode and capacitor, etc.) may measure the magnitude of test signal sigtx and may store the magnitude on memory 104. As another example, I/Q detector 100 may make I/Q measurements for the forward path that are stored on memory 104.

At least some of test signal sigtx will reflect off of antenna 40 (e.g., due to impedance discontinuities between transmit path 34 and antenna 40, subject to impedance loading from any external objects at or adjacent to antenna 40) and back towards PA 96 as reflected test signal sigtx'. When performing reverse path measurements, FW switch 74 is open, RW switch 76 is closed, switch 80 is open, and switch 78 is closed so that reflected test signal sigtx' is coupled off of transmit path 34 by directional coupler 72 and routed to measurement circuitry 70 through RW switch 76. Measurement circuitry 70 (e.g., power detector 98 or I/Q detector 100) may measure and store the amplitude (magnitude) and/or phase of reflected test signal sigtx' for further processing (e.g., as a reverse signal phase and magnitude measurement).

Comparator/logic 102 and/or control circuitry 14 (FIG. 1) may process the stored forward and reverse phase and magnitude measurements to identify complex scattering parameter values such as $S_{11}$ values. The $S_{11}$ values are characterized by a scalar magnitude $|S_{11}|$ and a corresponding phase. In this way, VSWR sensor 32 may measure VSWR values (e.g., $S_{11}$ values, $|S_{11}|$ values, etc.) that can be used to determine when external object 46 is located at a range R that is less than or equal to threshold range $R_{TH}$. Long range spatial ranging circuitry in communications circuitry 26 (FIG. 1) may also use antenna 40 to identify range R when external object 46 is located at a range R that is beyond threshold range $R_{TH}$ from antenna 40.

Figure 3:
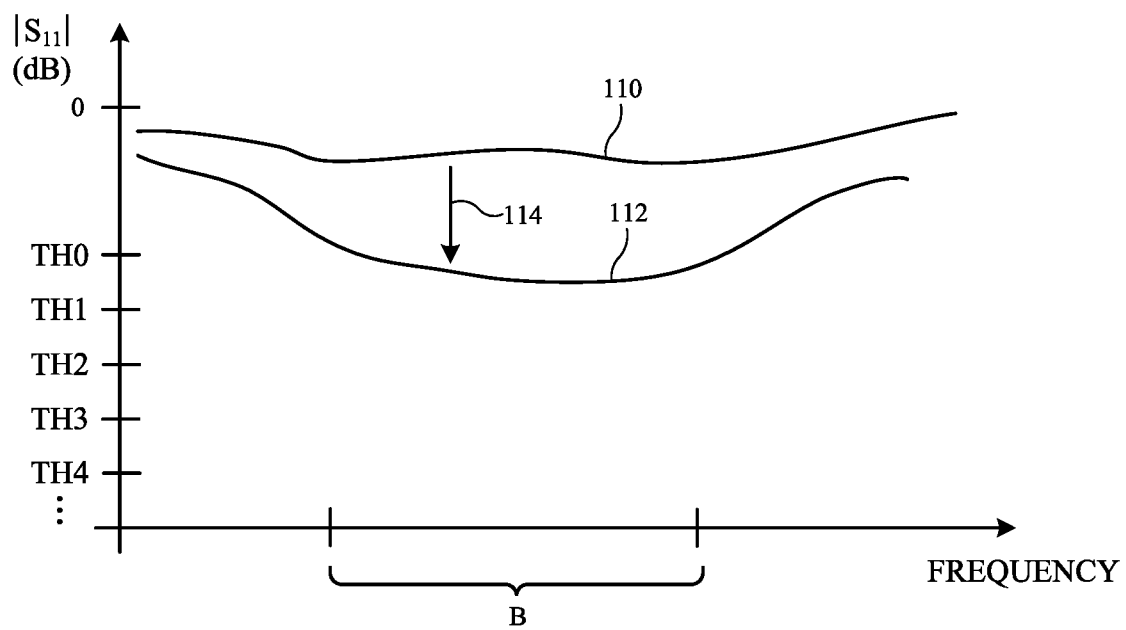
FIG. 3 is a plot of reflection coefficient as a function of frequency that may be produced by an illustrative VSWR sensor for detecting the range between an external object and an antenna in accordance with some embodiments.

If desired, control circuitry 14 may compare the VSWR measurements to one or more threshold values to identify range R. FIG. 3 is a plot showing how VSWR measurements made by VSWR sensor 32 may be compared to multiple threshold values to identify range R between external object 46 and the corresponding antenna 40. Curve 110 plots the magnitude of reflection S-parameter Si (i.e., $|S_{11}|$) as a function of frequency in the absence of external object 46 within threshold range $R_{TH}$. As shown by curve 110, in the absence of external object 46, $|S_{11}|$ may have a relatively high value across a frequency band of interest B.

Curve 112 plots $|S_{11}|$ as a function of frequency when external object 46 is within threshold range $R_{TH}$ from antenna 40. As shown by curve 112, $|S_{11}|$ may have a relatively low value across frequency band B due to the presence of external object 46. In general, once external object 46 is within threshold range $R_{TH}$, $|S_{11}|$ will continue to decrease, as shown by arrow 114, as the object approaches the corresponding antenna 40. Control circuitry 14 may gather VSWR values using VSWR sensor 32 (e.g., $|S_{11}|$ values such as those shown by curves 110 and 112) and may process the gathered VSWR values to identify range R when external object 46 is within threshold range $R_{TH}$ (e.g., by comparing the gathered $|S_{11}|$ values to one or more threshold levels TH).

For example, when the measured $|S_{11}|$ value is less than a first threshold TH0, control circuitry 14 may determine (e.g., identify, deduce, estimate, etc.) that external object 46 is located at a first range R from antenna 40 (e.g., within threshold range $R_{TH}$), when the measured $|S_{11}|$ is value less than a second threshold TH1, control circuitry 14 may determine that external object 46 is located at a second range R from antenna 40 that is closer than the first range, when the measured $|S_{11}|$ value is less than a third threshold TH2, control circuitry 14 may determine that external object 46 is located at a third range R from antenna 40 that is closer than the second range, etc. Beyond threshold range $R_{TH}$, $|S_{11}|$ will exhibit no change or a negligible change in response to changes in distance between antenna 40 and external object 46. At these relatively far distances, the long range spatial ranging circuitry in communications circuitry 26 (FIG. 1) may be used to detect the presence, position (e.g., range R), and/or velocity of external object 46.

The example of FIG. 3 in which control circuitry 14 identifies the range R between a given antenna 40 and external object 46 based on the magnitude of the VSWR measurements (e.g., $|S_{11}|$ measurements) performed using that antenna 40 is merely illustrative. Additionally or alternatively, control circuitry 14 may identify range R based on the phase of the $S_{11}$ measurements. Additionally or alternatively, control circuitry 14 may identify range R based on variations in the VSWR measurements over time.

Figure 4:
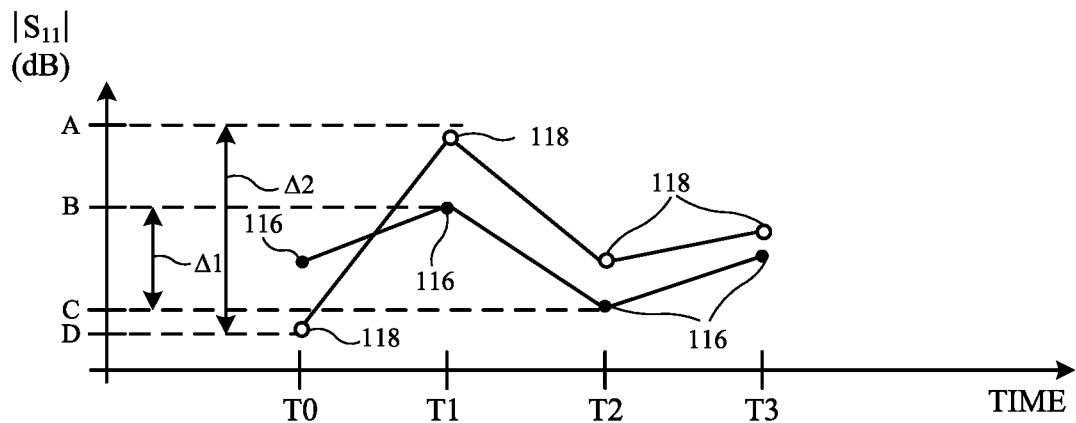
FIG. 4 is a plot showing how the reflection coefficient measured by an illustrative VSWR sensor may vary at different times when external objects are present at different ranges from an antenna in accordance with some embodiments.

FIG. 4 is a plot of different reflection coefficient (return loss) magnitude measurements ($|S_{11}|$ values) that may be made by a given VSWR sensor 32 as a function of time in the presence an external object 46 at different distances (ranges R) from the corresponding antenna 40. Points 116 of FIG. 4 illustrate $|S_{11}|$ measurements that may be made by VSWR sensor 32 at sampling times T0-T3 in the presence of an external object (e.g., an animate object) at a first range R from antenna 40 (e.g., within threshold range $R_{TH}$). The external object may be, for example, a body part such as a hand, finger, or head. As shown by points 116, there is a relatively high amount of variation in $|S_{11}|$ as a function of time in the presence of the external object at the first range R from antenna 40 (e.g., due to minute movements of the external object relative to static/inanimate objects such as a removable device case). Points 118 illustrate $|S_{11}|$ measurements that may be made by VSWR sensor 32 at times T0-T3 in the presence of the external object at a second range R from antenna 40 that is closer than the first range. As shown by points 118, there is even more variation in $|S_{11}|$ as a function of time in the presence of the external object at the second range R from antenna 40 (e.g., because minute movements of the external object produce a greater variation in the impedance loading of antenna 40 and thus the gathered VSWR measurements at closer ranges).

Control circuitry 14 may identify (e.g., detect, produce, compute, calculate, estimate, etc.) variations in the $|S_{11}|$ measurements over time to identify the range between antenna 40 and the external object (e.g., by comparing the identified variation to one or more threshold variation levels). Control circuitry 14 may perform range detection in this way based on any desired metric for the variation of VSWR (e.g., $|S_{11}|$) measurements over time. For example, control circuitry 14 may perform range detection based on the difference between the maximum $|S_{11}|$ value and the minimum $|S_{11}|$ value measured at each of the sampling times. For points 116, control circuitry 14 may identify (e.g., compute, calculate, generate, determine, etc.) a first difference value Δ1 that is equal to the difference between the maximum $|S_{11}|$ value B of points 116 (e.g., as measured at time T1) and the minimum $|S_{11}|$ value C of points 116 (e.g., as measured at time T2). Similarly, for points 118, control circuitry 14 may identify a second difference value Δ2 that is equal to the difference between the maximum $|S_{11}|$ value A of points 116 (e.g., as measured at time T1) and the minimum $|S_{11}|$ value D of points 118 (e.g., as measured at time T0). Difference value Δ2 is greater than distance value Δ1 and is therefore indicative of external object 46 being located at a closer range to antenna 40 than when distance value Δ1 is measured.

The example of FIG. 4 is merely illustrative. Points 116 and 118 may have other values in practice. In the example of FIG. 4, four sampling times T0-T3 are used to identify variations in $|S_{11}|$ for performing animate object detection. This is merely illustrative and, in general, any desired number of sampling times may be used to identify variations in $|S_{11}|$ for performing animate object detection. Each sampling time may be separated by 10 ms, 20 ms, 1-20 ms, more than 20 ms, 10-50 ms, or any other desired period. The sampling times need not be evenly spaced.

Figure 5:
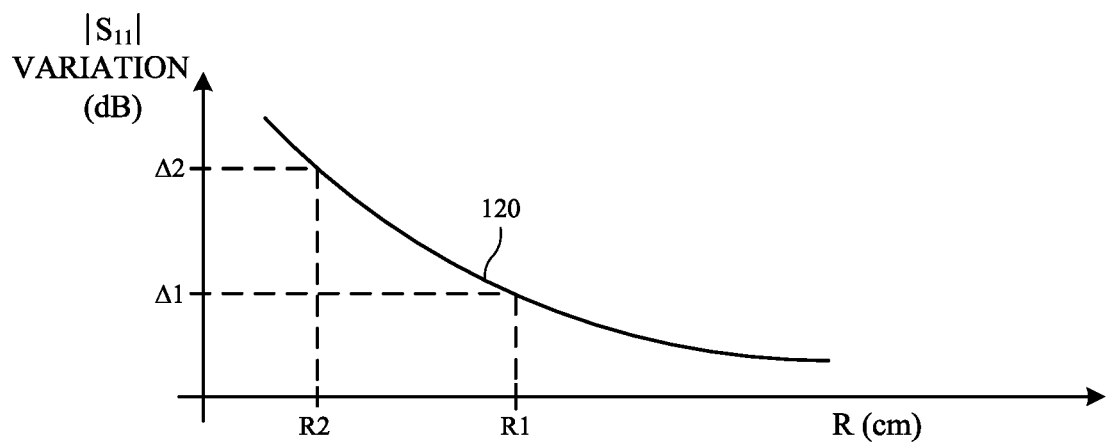
FIG. 5 is a plot showing how reflection coefficient variation may be correlated to the range between an antenna and an external object in accordance with some embodiments.

Curve 120 of FIG. 5 shows one example of how variation in IS may be correlated with the range between external object 46 and antenna 40. If desired, control circuitry 14 may compare the identified variation in the VSWR measurements (e.g., difference value Δ) to curve 120 to identify the corresponding range R between external object 46 and antenna 40. As shown by curve 120, control circuitry 14 may determine that external object 46 is located at first range R1 when difference value Δ1 is measured (e.g., by identifying the horizontal coordinate on curve 120 corresponding to difference value Δ1) and may determine that that external object 46 is located at second range R2 when difference value Δ2 is measured. This is merely illustrative and, if desired, control circuitry 14 may identify range R by comparing the measured difference value Δ to one or more threshold difference values, by comparing difference value Δ to entries in a lookup table, database, or other data structure, etc. Curve 120 may be stored on device 10 (e.g., during factory calibration, manufacture, assembly, testing, etc.). The example of FIG. 5 is merely illustrative and, in practice, curve 120 may have other shapes.

The example of FIGS. 4 and 5 is merely illustrative and, in general, control circuitry 14 may identify any desired metric of variance in $|S_{11}|$ for comparison to one or more threshold values in identifying the range R between external object 46 and antenna 40. As other examples, control circuitry 14 may identify the mean and variance of the $|S_{11}|$ measurements over time, the rate of change of $|S_{11}|$ measurements over time, and/or any other desired variation metrics for comparison to one or more threshold values for identifying range R.

In summary, control circuitry 14 may use VSWR measurements (e.g., $|S_{11}|$ values) measured using VSWR sensor 32 or variations in the VSWR measurements (e.g., variations in the $|S_{11}|$ values over time) gathered/performed using VSWR sensor 32 to detect (e.g., identify, determine, estimate, compute, calculate, deduce, etc.) the range R between external object 46 and the corresponding antenna 40. Control circuitry 14 may process the range R between external object 46 and each antenna 40 in the set of N antennas 40 having a corresponding VSWR sensor 32 to identify the angular location of external object 46.

Figure 6:
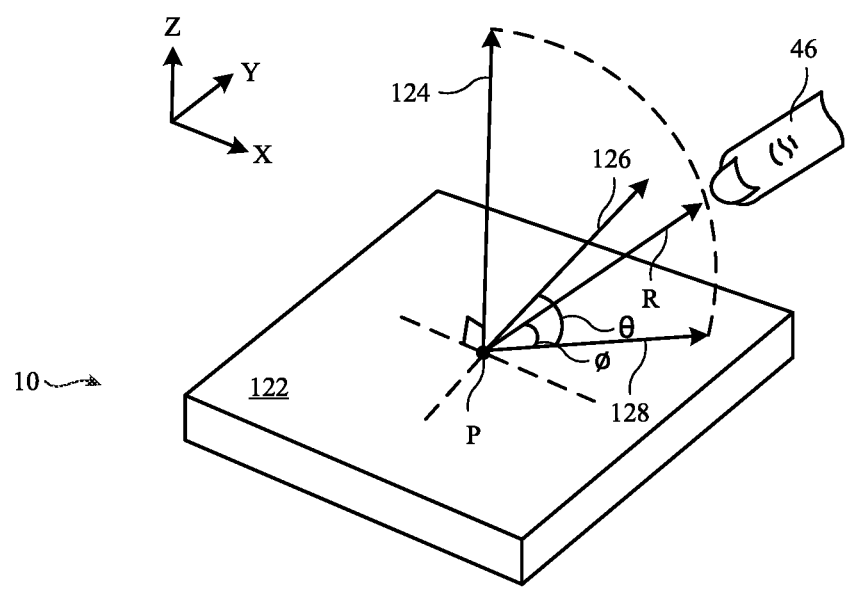
FIG. 6 is a perspective view showing how an external object may be present at a given angular location over an electronic device surface in accordance with some embodiments.

FIG. 6 illustrates one example of how the angular location of external object 46 may be defined. External object 46 is illustrated as a human finger herein as an example. This is merely illustrative and, in general, external object 46 may be other body parts of the user of device 10, other humans or animals, furniture, walls, ceilings, the ground, a peripheral device or accessory such as a gaming controller, user interface/input device, or headset, and/or any other object external to device 10.

In the example of FIG. 6, the control circuitry on device 10 (e.g., control circuitry 14 of FIG. 1) uses a spherical coordinate system to determine the location and orientation of external object 46 relative to a (lateral) surface 122 of device 10. Surface 122 may, for example, be a surface of a housing wall for device 10 (e.g., housing 12 of FIG. 1), a surface of a cover layer for device 10 (e.g., a dielectric cover layer), a surface of a display on or mounted to the housing, the surface of an antenna module on or within device 10, or any other desired surface on, at, or within device 10. Surface 122 need not be planar.

In this type of coordinate system, control circuitry 14 may process the range R between two or more antennas 40 (e.g., as identified using VSWR measurements gathered using the two or more antennas as described above in connection with FIGS. 2-5) to determine (e.g., calculate, compute, detect, estimate, deduce, generate, etc.) an azimuth angle θ and/or an elevation angle φ that characterize (identify) the angular location of external object 46 relative to a point P on surface 122 (or some other reference surface). When viewed in the −Z direction, point P may be laterally located between two or more of the antennas 40 in device 10 having a corresponding VSWR sensor 32 (for example).

In identifying the angular location of external object 46 (e.g., a spherical coordinate value (θ, φ), sometimes referred to herein as angle-of-arrival), control circuitry 14 may define a reference plane at lateral surface 122 and a reference vector such as reference vector 126. Reference vector 126 may lie within the reference plane (e.g., lateral surface 122).

As shown in FIG. 6, external object 46 may be separated from point P by range R (e.g., where range R is the magnitude of a positional vector extending from point P to external object 46). The elevation angle φ (sometimes referred to as altitude) of external object 46 may be measured as the angle between the positional vector extending from point P to external object 46 and the reference plane (e.g., lateral surface 122). The azimuth angle θ of external object 46 may be measured as the angle of external object 46 around the reference plane (e.g., the angle between reference vector 126 and vector 128, which is the horizontal projection of the positional vector extending from point P to external object 46 within the reference plane). In the example of FIG. 6, the azimuth angle θ and elevation angle φ of external object 46 are each greater than 0°.

If desired, other axes may be used to define reference vector 126 (e.g., reference vector 126 may point in any direction). Other angles may be used to characterize the angular location of external object 46 (e.g., the angle between the normal vector (axis) 124 of surface 122 and the positional vector extending from point P to external object 46, which is equal to 90°−φ, other angles, etc.). The example of FIG. 6 in which the angular position of external object 46 is characterized using spherical coordinates (e.g., as an angular position (θ, φ)) is merely illustrative. In general, control circuitry 14 may characterize or identify the angular location of external object 46 using any desired coordinate system (e.g., rectangular/Cartesian coordinates, polar coordinates, cylindrical coordinates, other coordinate systems, etc.) about any desired reference axes. The reference plane may be arbitrarily selected if desired and need not coincide with the presence of a surface of device 10 such as surface 122.

Figure 7:
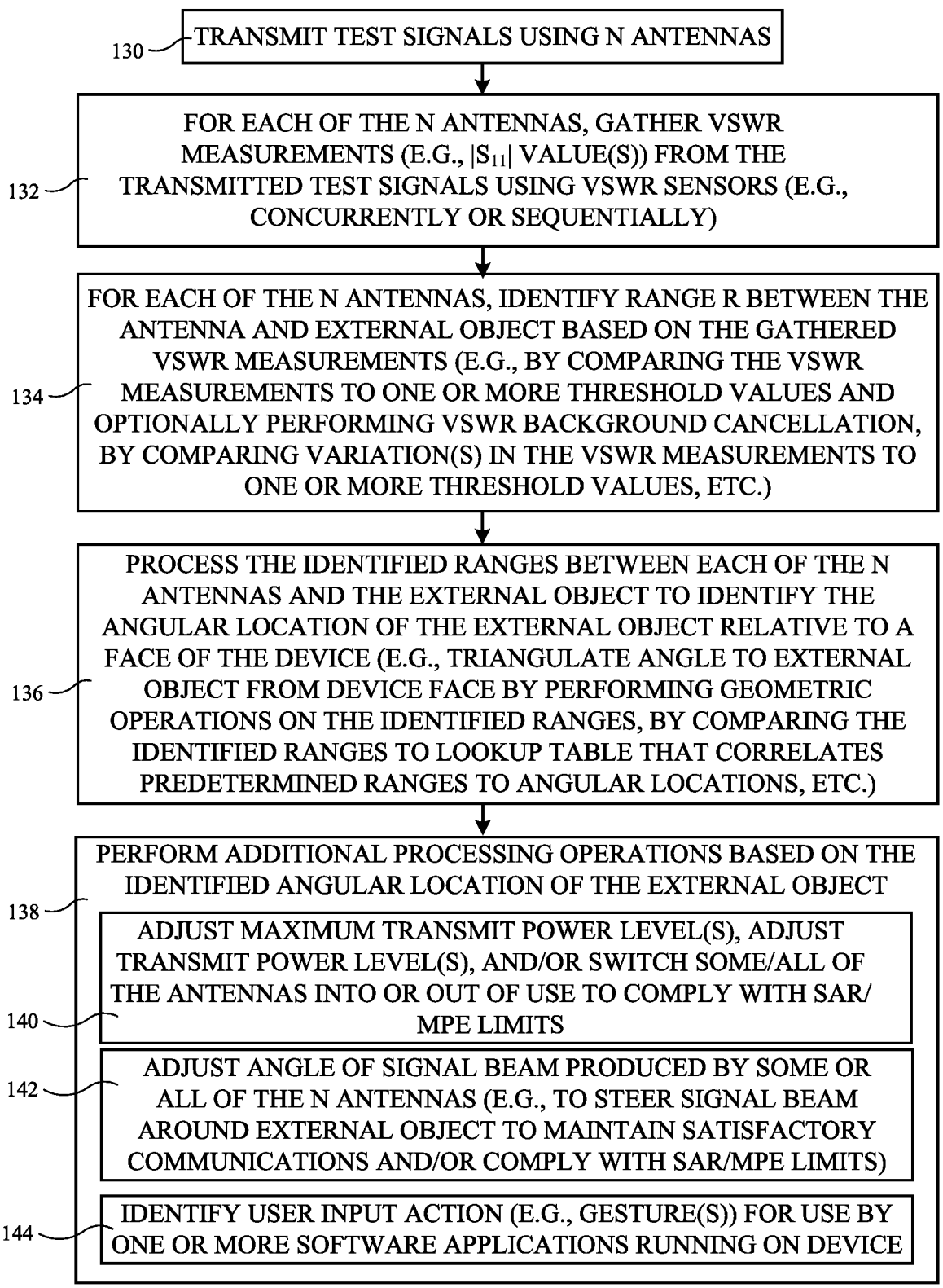
FIG. 7 is a flow chart of illustrative operations involved in detecting the angular location of an external object using VSWR sensors and multiple antennas in accordance with some embodiments.

FIG. 7 is a flow chart of illustrative operations that may be performed by device 10 to identify the angular location of external object 46 using VSWR values gathered using multiple antennas 40 on device 10 (e.g., a set of N antennas 40 each having a respective VSWR sensor 32 communicatively coupled thereto along a respective transmit path 34). The number N may be two, three, four, five, six, seven, eight, or more than eight, as examples. Each of the N antennas 40 may be disposed at different points on/across device 10.

At operation 130, control circuitry 14 may control wireless circuitry 24 to transmit test signals sigtx (FIG. 2) over each of the N antennas 40. Test signals sigtx may be transmitted over each of the N antennas 40 concurrently (e.g., simultaneously) or sequentially (in series). Test signals sigtx may be transmitted at a single carrier frequency or over a range/sweep of frequencies. The N antennas 40 may begin transmitting test signals sigtx once one or more of the VSWR sensors 32 has already detected that external object 46 has passed within threshold range $R_{TH}$ of the corresponding antenna 40 or in response to any desired trigger condition (e.g., an application or software call on control circuitry 14, once VSWR measurements such as IS 11I measurements reach a predetermined threshold value, etc.).

As another example, the control circuitry 14 may perform operation 130 once device 10 has determined that gathered wireless performance metric data has fallen outside of a predetermined range. In this example, wireless circuitry 24 may gather wireless performance metric data associated with the radio-frequency performance of antenna(s) 40. The wireless performance metric data may include signal-to-noise ratio (SNR) data, receive signal strength indicator (RSSI) data, or any other desired performance metric data gathered during the transmission of radio-frequency signals 38, the transmission of radio-frequency signals 42, the reception of radio-frequency signals 38, and/or the reception of reflected signals 44 of FIG. 1, for example. Control circuitry 14 may compare the gathered wireless performance metric data with a predetermined range of wireless performance metric values associated with satisfactory radio-frequency performance and/or the operation of wireless circuitry 24 in the absence of external objects within threshold range $R_{TH}$ (e.g., a predetermined range of satisfactory RSSI values, SNR values, etc.). The predetermined range of wireless performance metric values may be characterized by an upper threshold limit or value and/or a lower threshold limit or value.

In this example, the wireless performance metric data may serve as a coarse indicator for whether external object 46 is within threshold range $R_{TH}$. For example, if external object 46 is within range $R_{TH}$, external object 46 may partially block or cover one or more antennas 40 (thereby preventing the antenna from properly receiving radio-frequency signals), may undesirably load or detune one or more antennas 40 in device 10, etc. When the gathered wireless performance metric data falls outside of the predetermined range, this may be indicative of the potential presence of external object 46 within threshold range $R_{TH}$. However, when the gathered wireless performance metric data falls within the predetermined range, this may indicate that it is very unlikely that there is an external object present within threshold range $R_{TH}$ (e.g., because wireless circuitry 24 is performing nominally as expected in the absence of an external object within threshold range $R_{TH}$). If the gathered wireless performance metric data falls within the predetermined range (thereby indicating that there is no external object within threshold range $R_{TH}$), VSWR sensor(s) 32 may gather background VSWR measurements for performing background cancellation if desired. In general, operation 130 may be performed in response to any desired trigger condition.

At operation 132, control circuitry 14 may use the respective VSWR sensor 32 (e.g., measurement circuitry 70 of FIG. 2) coupled to each of the N antennas 40 to perform at least N VSWR measurements (e.g., $S_{11}$ values, $|S_{11}|$ values, time-variations in the $|S_{11}|$ values such as difference values Δ of FIGS. 4 and 5, etc.) for each of the N antennas 40 using the transmitted test signals sigtx. Control circuitry 14 may perform the VSWR measurements for each of the N antennas 40 concurrently (e.g., when the N antennas 40 transmit test signals sigtx concurrently) or sequentially (e.g., when the N antennas 40 transmit test signals sequentially). Operation 132 may, for example, be performed concurrently with operation 130. In examples where the VSWR measurements are performed sequentially, two or more (e.g., all) of the N antennas 40 may share a single transmit path 34 and VSWR sensor 32 if desired.

At operation 134, control circuitry 14 may process the VSWR measurements for each of the N antennas 40 to identify (e.g., determine, detect, estimate, calculate, compute, deduce, etc.) the respective range R between each of the N antennas 40 and external object 46. Control circuitry 14 may identify ranges R by comparing the VSWR measurements to one or more threshold values. For example, control circuitry 14 may identify ranges R by comparing IS values gathered using each of the N antennas 40 to threshold values TH of FIG. 3, by comparing difference values Δ of FIG. 4 to one or more threshold values or to curve 120 of FIG. 5, by comparing the phases of the VSWR measurements to one or more threshold values, etc. Control circuitry 14 need not use the same method to calculate VSWR for each of the N antennas 40 (e.g., control circuitry 14 may identify range R using variations in the VSWR measurements over time for some of the N antennas 40 while identifying range R using $|S_{11}|$ values for others of the N antennas 40, etc.).

If desired, control circuitry 14 may identify range R while also performing VSWR background cancellation. For example, control circuitry 14 may use the VSWR sensor(s)

32 to gather background VSWR measurements in the absence of other external objects within threshold range $R_{TH}$ from the corresponding antenna(s) 40 (e.g., where the background VSWR measurements also take into account the presence of the removable device case). Control circuitry 14 may then use the background VSWR measurements to perform background cancellation on subsequent VSWR measurements (e.g., as performed at operation 132) that are gathered in the presence of external object 46 within threshold range $R_{TH}$ (e.g., by subtracting the background VSWR measurements from the subsequent VSWR measurements).

At operation 136, control circuitry 14 may process each of the N identified ranges R (e.g., the range R identified between each of the N antennas 40 and external object 46) to identify (e.g., determine, calculate, estimate, deduce, generate, triangulate, resolve, etc.) the angular location of external object 46 relative to surface 122 of device 10 (FIG. 6) or any other desired reference plane. Control circuitry 14 may identify the angular location of external object 46 (e.g., a point (θ, φ) in spherical coordinates or any other desired coordinate system) by performing geometric calculations based on (using) the identified ranges R between the N antennas 40 and external object 46 and the known (predetermined) separation/spacing between each of the N antennas. Each range R may, for example, be the radius of a sphere of potential locations for device 10 centered on the corresponding antenna 40. Control circuitry 14 may identify the location of external object 46 as the location/point where each of the N spheres intersect in space. Control circuitry 14 may then identify the angular location of external object 46 as the angle of a vector extending from any desired point on lateral surface 122 (e.g., point P of FIG. 6) to the location/point where each of the N spheres intersect in space (e.g., angles relative to any desired vectors such as vectors 126, 128, and/or 124 of FIG. 6 or other vectors and in any desired coordinate system). In spherical coordinates, this angle may be characterized by a spherical point (θ, φ), for example. Additionally or alternatively, control circuitry 14 may identify the angular location using a lookup table, database, or other data structure that maps different range values R for each of the N antennas to different angular locations for external object 46 (in any desired angular coordinate system about any desired reference points or reference vectors). The lookup table, database, or other data structure may be populated during design, manufacture, assembly, testing, or calibration of device 10 and/or may be populated/updated during operation of device 10 by an end user.

At operation 138, control circuitry 14 may perform any desired processing operations based on the identified angular location of external object 46. For example, at operation 140, control circuitry 14 may adjust the transmit power level or maximum transmit power level of one or more of the antennas 40 on device 10 based on the angular location of external object 46 (e.g., control circuitry 14 may increase the transmit power level or the maximum transmit power level of antennas 40 that are relatively far from external object 46 and/or may decrease the transmit power level or maximum transmit power level of antennas 40 that are relatively close to external object 46). If desired, control circuitry 14 may disable or activate antennas 40 based on the identified angular location (e.g., control circuitry 14 may switch antennas 40 that are too close to external object 46 out of use). These techniques may, for example, help to ensure that device 10 continues to satisfy regulatory limits on radio-frequency energy exposure (e.g., SAR/MPE limits).

As another example, at operation 142, control circuitry 14 may adjust the angle of a signal beam produced by a phased antenna array of the antennas 40 in device 10 (e.g., the N antennas 40 used to gather VSWR measurements and/or other antennas 40) based on the identified angular location of external object 46. For example, control circuitry 14 may adjust (steer) the signal beam around the identified angular location (e.g., to point the signal beam in a different angle than the identified angular location). This may prevent the signal beam from overlapping the external object, thereby helping device 10 to satisfy regulatory limits on radio-frequency energy exposure while also allowing device 10 to continue to perform wireless operations over the signal beam without the external object blocking the signal beam.

As yet another example, at operation 144, control circuitry 14 may identify a user input action such as a gesture action based on the identified angular location. Control circuitry 14 may identify a particular user input or gesture corresponding to the identified angular location and/or corresponding to particular changes in angular location of external object 46 over time (e.g., over multiple iterations of operations 130-136 of FIG. 7). The user input or gesture may, for example, form a user input used by software applications running on device 10 to perform any desired processing tasks, operations, or functions. The gestures may, for example, be used to control, perform, or coordinate on-screen actions displayed on a display for device 10 using the software applications.

The example of FIG. 7 is merely illustrative. Operations 140, 142, and/or 144 may be omitted. Control circuitry 14 may perform any other desired processing operations or device functions based on the identified angular location of external object 46 and/or the identified angular location of external object 46 over time (e.g., over multiple iterations of the operations of FIG. 7).

Figure 8:
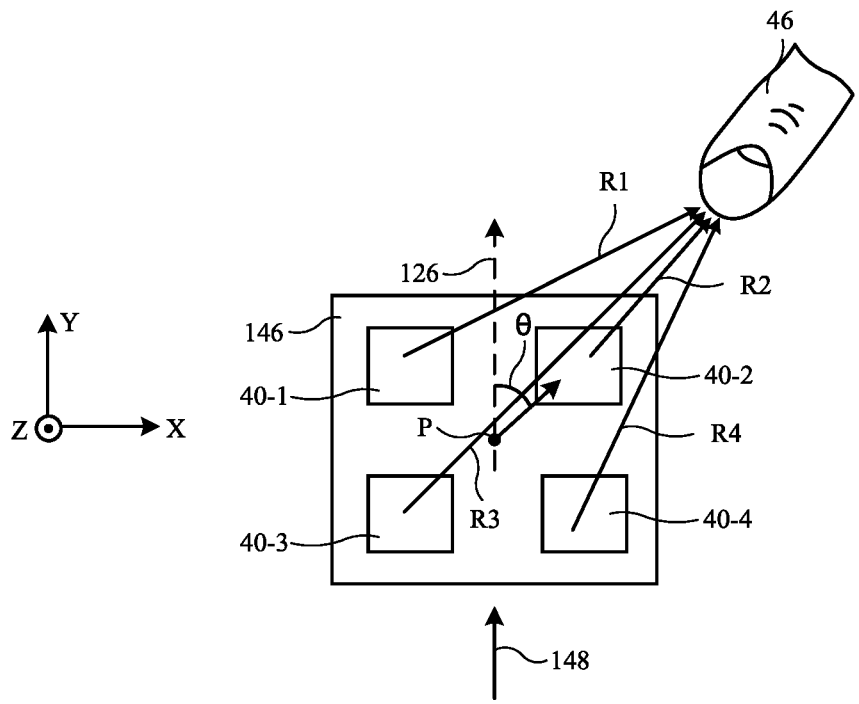
FIG. 8 is a top view showing how multiple antennas may be used to detect the angular location of an external object in accordance with some embodiments.

FIG. 8 is a top view showing one example of how N=4 antennas 40 may be used to identify the angular location of external object 46. In the example of FIG. 8, antennas 40-1, 40-2, 40-3, and 40-4 may each be coupled to a respective transmit path 34 having a respective VSWR sensor 32. In examples where the N antennas gather VSWR measurements sequentially, two or more of the antennas may share a single transmit path 34 and VSWR sensor 32. Antennas 40-1, 40-2, 40-3, and/or 40-4 may also be used to convey wireless communications data and/or to perform long range spatial ranging for communications circuitry 26 of FIG. 1. If desired, some or all of antennas 40-1, 40-2, 40-3, and 40-4 may form part of a phased antenna array (e.g., antennas 40-1, 40-2, 40-3, and 40-4 may be a four-element phased antenna array).

As shown in FIG. 8, antennas 40-1, 40-2, 40-3, and 40-4 may be formed on or within a substrate such as substrate 146. Substrate 146 may be a printed circuit such as a rigid printed circuit board or flexible printed circuit, may be a plastic, ceramic, or glass substrate, may be a housing wall or cover layer for device 10, may be a portion of a display for device 10, or may be any other desired dielectric material. This example is merely illustrative and, if desired, each antenna may be disposed on a respective substrate 146, the antennas may be divided between two or more substrates 146, or one or more of the antennas may be disposed in device 10 without a substrate. The uppermost surface of substrate 146 may, for example, form surface 122 of FIG. 6.

During angular detection operations, antennas 40-1, 40-2, 40-3, and 40-4 may each transmit test signals sigtx (e.g., while processing operation 130 of FIG. 7). The VSWR sensor(s) 32 coupled to antennas 40-1, 40-2, 40-3, and 40-4 may perform VSWR measurements using the test signals sigtx transmitted by each of the antennas (e.g., while processing operation 132 of FIG. 7). Control circuitry 14 may process the VSWR measurement(s) performed using antenna 40-1 to identify the range R1 between antenna 40-1 and external object 46, may process the VSWR measurement(s) performed using antenna 40-2 to identify the range R2 between antenna 40-2 and external object 46, may process the VSWR measurement(s) performed using antenna 40-3 to identify the range R3 between antenna 40-3 and external object 46, and may process the VSWR measurement(s) performed using antenna 40-4 to identify the range R4 between antenna 40-4 and external object 46.

Figure 9:
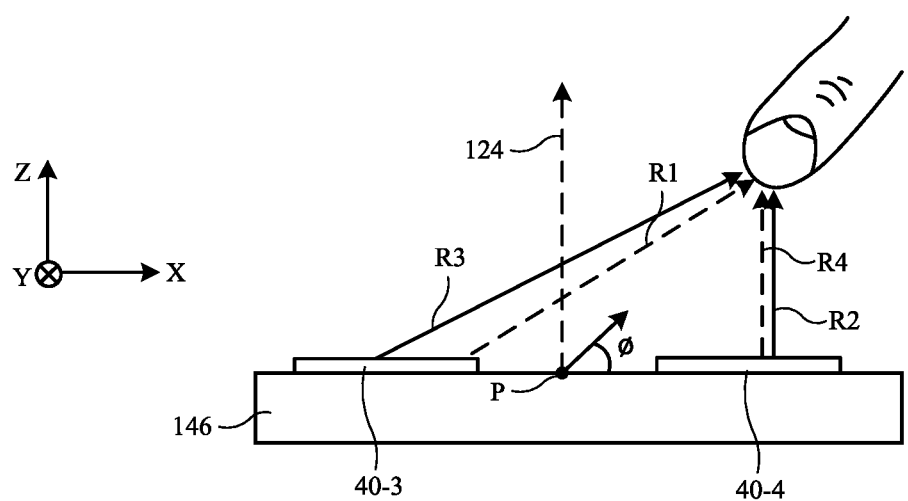
FIG. 9 is a side view showing how multiple antennas may be used to detect the angular location of an external object in accordance with some embodiments.

The top view of FIG. 8 shows the lateral projections of ranges R1-R4 in the X-Y plane. FIG. 9 is a side view of the antennas 40-1, 40-2, 40-3, and 40-4 on substrate 146 (e.g., as taken in the direction of arrow 148 of FIG. 8). FIG. 9 shows the projections of ranges R1-R4 in the X-Z plane (e.g., ranges R1-R4 may be the magnitudes of three-dimensional position vectors extending from antennas 40-1, 40-2, 40-3, and 40-4 to external object 46, respectively). Range R1 may correspond to the radius of a sphere of potential locations for external object 46 that is centered on antenna 40-1. Range R2 may correspond to the radius of a sphere of potential locations for external object 46 that is centered on antenna 40-2. Range R3 may correspond to the radius of a sphere of potential locations for external object 46 that is centered on antenna 40-3. Range R4 may correspond to the radius of a sphere of potential locations for external object 46 that is centered on antenna 40-4.

Control circuitry 14 may process ranges R1-R4 to identify the angular location of external object 46 while processing operation 136 of FIG. 7 (e.g., by identifying the angular position of the point/location where each of the spheres corresponding to ranges R1-R4 intersect, by comparing ranges R1-R4 to a lookup table of angular locations, etc.). For example, control circuitry 14 may identify the angle θ at point P to external object 46 relative to reference vector 126 (FIG. 8) and the angle φ at point P to external object 46 relative to the lateral surface of substrate 146 (e.g., lateral surface 122 of FIG. 6) in spherical coordinates. Point P may be located between (e.g., equidistant from) antennas 40-1, 40-2, 40-3, and 40-4 or may be at any other desired location on the lateral surface of substrate 146. This is merely illustrative and, in general, control circuitry 14 may identify the angular location of external object 46 using any desired coordinate system and with respect to any desired location (e.g., point P) on device 10. The example of FIGS. 8 and 9 in which N=4 antennas 40 are used to identify the angular location of external object 46 is merely illustrative and, in general, N may have other values greater than two. The N antennas may be arranged in any desired pattern (e.g., in a two-dimensional array pattern, a one-dimensional array pattern, a pattern of concentric rings, etc.) and may be formed using any desired type of antenna resonating elements.

Figure 10:
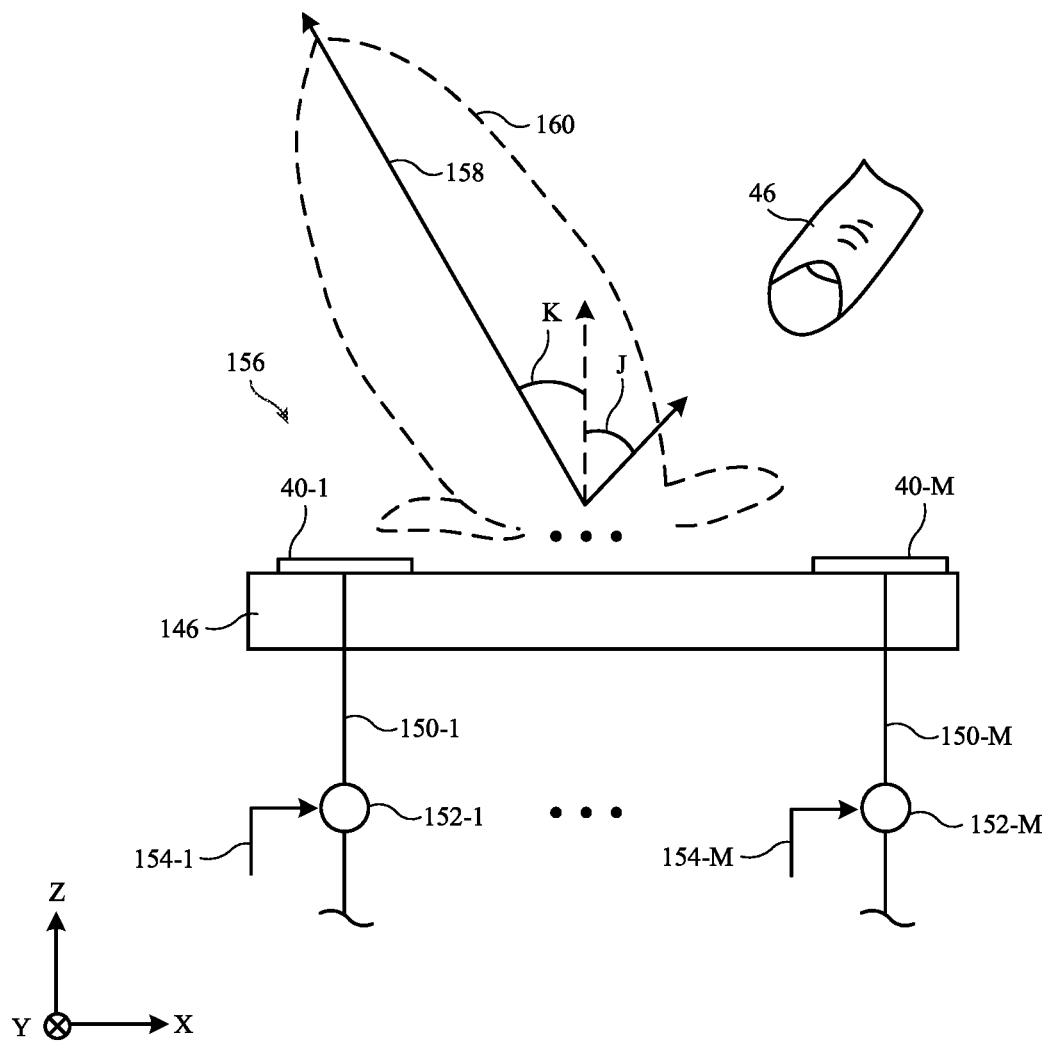
FIG. 10 is a side view showing how multiple antennas may perform beam steering operations based on the detected angular location of an external object in accordance with some embodiments.

FIG. 10 is a side view showing how the angular location of external object 46 may be used to perform beam steering operations (e.g., while processing operation 142 of FIG. 7). As shown in FIG. 10, device 10 may include a phased antenna array 156 (sometimes referred to herein as array 156, antenna array 156, or array 156 of antennas 40). Phased antenna array 156 may include M antennas 40 such as a first antenna 40-1, an Mth antenna 40-M, etc. The antennas in phased antenna array 156 may be disposed on substrate 146, on another substrate, or may be distributed across two or more substrates. Phased antenna array 156 may be coupled to radio-frequency transmission line paths 150 (e.g., radio-frequency transmission line paths used to form transmit path(s) 34 and/or receive path(s) 36 of FIG. 1). For example, a first antenna 40-1 in phased antenna array 156 may be coupled to a first radio-frequency transmission line path 150-1, an Mth antenna 40-M in phased antenna array 156 may be coupled to an Mth radio-frequency transmission line path 150-M, etc. Some, none, or all of the M antennas in phased antenna array 40 may be among the N antennas 40 used to identify the angular location of external object 46. While antennas 40 are described herein as forming a phased antenna array, the antennas 40 in phased antenna array 156 may sometimes also be referred to as collectively forming a single phased array antenna (e.g., where each antenna 40 in the phased array antenna forms an antenna element or radiator of the phased array antenna).

Radio-frequency transmission line paths 150 may each be coupled to transceiver circuitry such as a 5G NR transceiver in communications circuitry 26 of FIG. 1. Each radio-frequency transmission line path 150 may include one or more radio-frequency transmission lines, a positive signal conductor, and a ground signal conductor. The positive signal conductor may be coupled to a positive antenna feed terminal on an antenna resonating element of the corresponding antenna 40. The ground signal conductor may be coupled to a ground antenna feed terminal on an antenna ground for the corresponding antenna 40.

The antennas 40 in phased antenna array 156 may be arranged in any desired number of rows and columns or in any other desired pattern (e.g., the antennas need not be arranged in a grid pattern having rows and columns). During signal transmission operations, radio-frequency transmission line paths 150 may be used to supply signals (e.g., radio-frequency signals such as millimeter wave and/or centimeter wave signals) from the transceiver in communications circuitry 26 (FIG. 1) to phased antenna array 156 for wireless transmission. During signal reception operations, radio-frequency transmission line paths 150 may be used to convey signals received at phased antenna array 156 (e.g., from external wireless equipment 28 of FIG. 1) to the transceiver in communications circuitry 26.

The use of multiple antennas 40 in phased antenna array 156 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 10, the antennas 40 in phased antenna array 156 each have a corresponding radio-frequency phase and magnitude controller 152 (e.g., a first phase and magnitude controller 152-1 interposed on radio-frequency transmission line path 150-1 may control phase and magnitude for radio-frequency signals handled by antenna 40-1, an Mth phase and magnitude controller 152-M interposed on radio-frequency transmission line path 150-M may control phase and magnitude for radio-frequency signals handled by antenna 40-M, etc.).

Phase and magnitude controllers 152 may each include circuitry for adjusting the phase of the radio-frequency signals on radio-frequency transmission line paths 150 (e.g., phase shifter circuits) and/or circuitry for adjusting the magnitude of the radio-frequency signals on radio-frequency transmission line paths 150 (e.g., power amplifier and/or low noise amplifier circuits). Phase and magnitude controllers 152 may sometimes be referred to collectively herein as beam steering or beam forming circuitry (e.g., beam steering circuitry that steers the beam of radio-frequency signals transmitted and/or received by phased antenna array 156).

Phase and magnitude controllers 152 may adjust the relative phases and/or magnitudes of the transmitted signals that are provided to each of the antennas in phased antenna array 156 and may adjust the relative phases and/or magnitudes of the received signals that are received by phased antenna array 156. Phase and magnitude controllers 152 may, if desired, include phase detection circuitry for detecting the phases of the received signals that are received by phased antenna array 156. The term "beam," "signal beam," "radio-frequency beam," or "radio-frequency signal beam" may be used herein to collectively refer to wireless signals that are transmitted and received by phased antenna array 156 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 152 are adjusted to produce a first set of phases and/or magnitudes for transmitted radio-frequency signals, the transmitted signals will form a transmit beam that is oriented in a first direction such as the direction of external object 46. If, however, phase and magnitude controllers 152 are adjusted to produce a second set of phases and/or magnitudes for the transmitted signals, the transmitted signals will form a transmit beam as shown by beam 160 that is oriented in direction 158, which points away from external object 46. Similarly, if phase and magnitude controllers 152 are adjusted to produce the first set of phases and/or magnitudes, radio-frequency signals (e.g., radio-frequency signals in a receive beam) may be received from the direction external object 46. If phase and magnitude controllers 152 are adjusted to produce the second set of phases and/or magnitudes, radio-frequency signals may be received from direction 158, as shown by beam 160.

Each phase and magnitude controller 152 may be controlled to produce a desired phase and/or magnitude based on a corresponding control signal 154 received from control circuitry 14 of FIG. 1 (e.g., the phase and/or magnitude provided by phase and magnitude controller 152-1 may be controlled using control signal 154-1, the phase and/or magnitude provided by phase and magnitude controller 152-M may be controlled using control signal 154-M, etc.). If desired, control circuitry 14 may actively adjust control signals 154 in real time to steer the transmit or receive beam in different desired directions (e.g., to different desired beam pointing angles) over time. In the example of FIG. 10, beam steering is shown as being performed over a single degree of freedom for the sake of simplicity (e.g., towards the left and right on the page of FIG. 10). However, in practice, the beam may be steered over two or more degrees of freedom (e.g., in three dimensions, into and out of the page and to the left and right on the page of FIG. 10) or in a single degree of freedom (e.g., when the antennas 40 in phased antenna array are arranged in a one-dimensional pattern). Phased antenna array 156 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

While processing operation 136 of FIG. 7, control circuitry 14 may determine that external object 46 is at direction (angular location) J with respect to phased antenna array 156. While processing operation 142 of FIG. 7, control circuitry 14 may adjust phase and magnitude controllers 152 to steer signal beam 160 in direction 158 (e.g., away from direction J) so the signal beam does not overlap external object 46. This may help to ensure that phased antenna array 156 continues to comply with regulations on RF exposure and/or to ensure that phased antenna array 156 is able to convey wireless communications data and/or perform spatial ranging operations despite the presence of external object 46 in proximity to phased antenna array 156.

Figure 11:
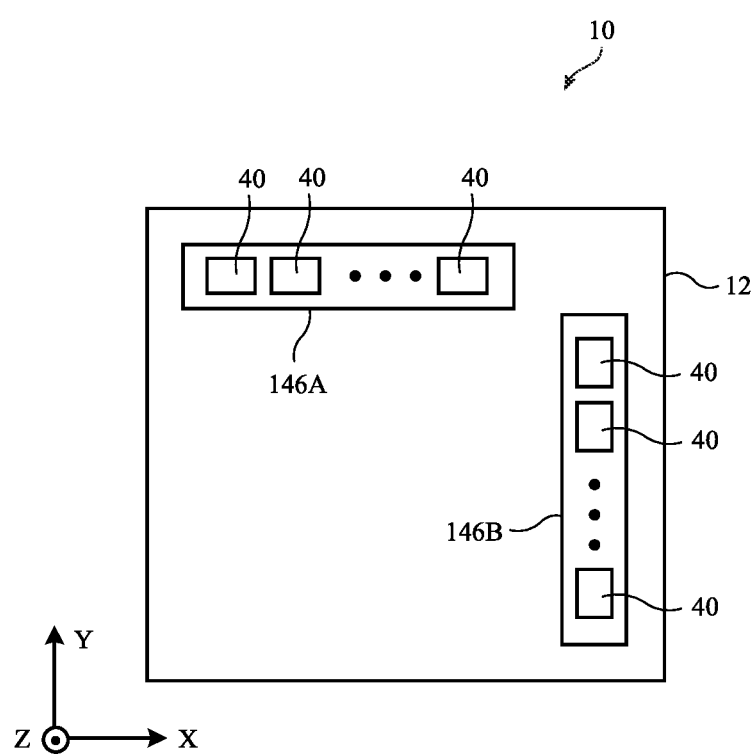
FIG. 11 is a top view showing how antennas used to detect the angular location of an external object may be distributed across multiple arrays at different orientations in accordance with some embodiments.

If desired, the N antennas 40 used to identify the angular location of external object 46 may be distributed across two or more substrates. FIG. 11 is a top view of device 10 showing one example of how the N antennas 40 may be distributed across two substrates.

As shown in FIG. 11, the N antennas 40 used to identify the angular location of external object 46 may include a first set of antennas 40 on a first substrate 146A and a second set of antennas 40 on a second substrate 146B disposed within housing 12 of device 10. The first set of antennas may, for example, be arranged in a one-dimensional pattern on substrate 146A whereas the second set of antennas are arranged in a one-dimensional pattern on substrate 146B. Because a single one-dimensional array of antennas may be insufficient to fully resolve ambiguities in the angular location of external object 46, the second set of antennas 40 on substrate 146B may be oriented perpendicular to the first set of antennas 40 on substrate 146A (e.g., the antennas 40 on substrate 146A may be disposed along a first axis, the antennas 146B may be disposed along a second axis, and the second axis may be oriented perpendicular to the first axis). The first and the second sets of antennas may then be able to resolve the correct angular location of external object 46. The first set of antennas 40 and the second set of antennas 40 may radiate through a rear face of device 10 (e.g., a face of device 10 opposite to a display for device 10) or may radiate through the front face of device 10. Substrates 146A and 146B may, for example, be sufficiently narrow so as to allow the N antennas distributed across substrate 146A and 146B to perform VSWR measurements through an inactive area of a display on the front face of device 10 (e.g., an area of the display that is overlapped by a dielectric cover layer and that is laterally interposed between an active light-emitting area of the display and peripheral conductive housing structures for device 10). The first and second sets of antennas may form respective one-dimensional phased antenna arrays 156 if desired. Additionally or alternatively, the N antennas 40 may be disposed in a two-dimensional array pattern on one or more substrates 146.

Figure 12:
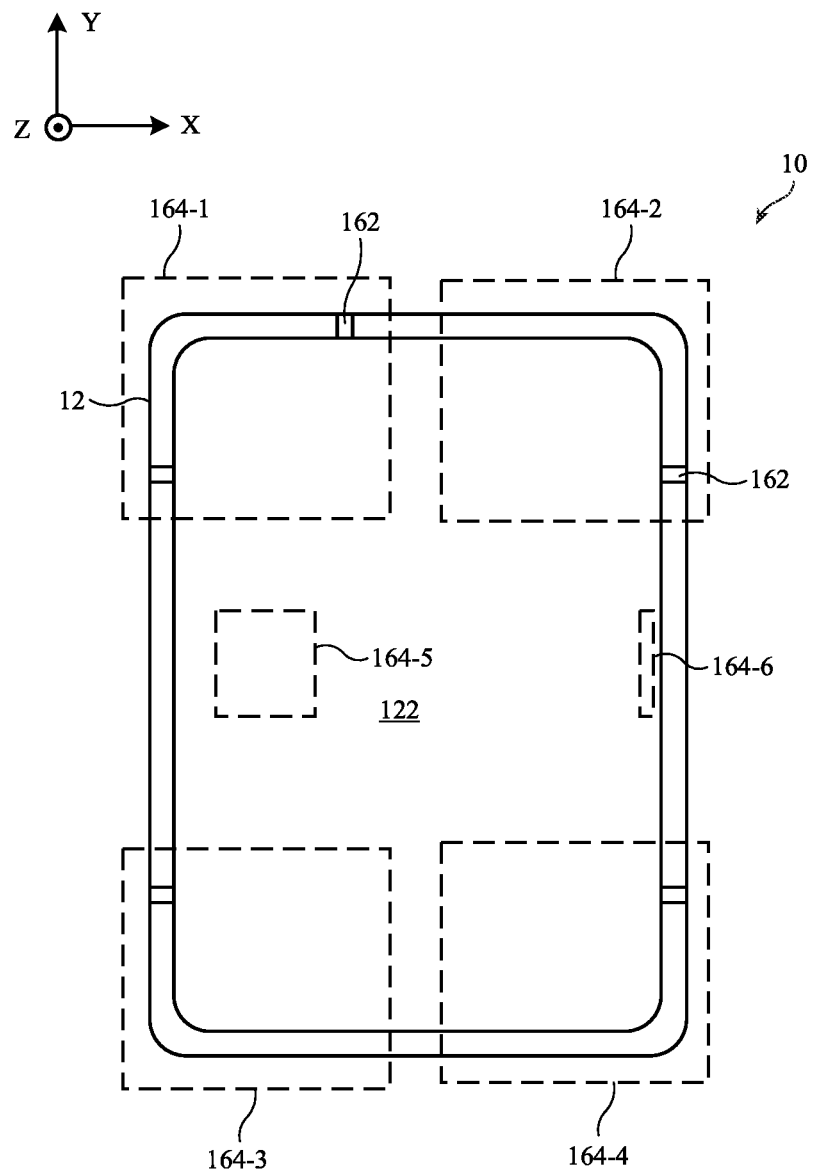
FIG. 12 is a top view showing how antennas used to detect the angular location of an external object may be distributed across an electronic device in accordance with some embodiments.

These examples are merely illustrative. Some or all of the N antennas 40 need not be disposed on substrate 146 or arranged in any array pattern. More generally, the N antennas 40 used to measure the angular location of external object 46 may be distributed across any desired locations on device 10. FIG. 12 is a top view showing illustrative locations for distributing some or all of the N antennas 40 used to measure the angular location of external object 46.

As shown in FIG. 12, one or more of the N antennas 40 may be located within one or more regions 164 on or within device 10 such as region 164-1 at the top-left corner of device 10, region 164-2 at the top-right corner of device 10, region 164-3 at the bottom-left corner of device 10, region 164-4 at the bottom-right corner of device 10, one or more regions 164-5 within a central region of device 10, and/or one or more regions 164-6 laterally interposed between an active area of a display for device 10 and housing 12.

Separating two or more of the N antennas 40 by relatively large distances and increasing the number N of antennas 40 used to perform VSWR measurements may increase the resolution with which control circuitry 14 is able to determine the angular location of external object 46. Control circuitry 14 may determine the angular location of external object 46 with an angular resolution of as fine as 1-2°, for example. In the example of FIG. 12, one or more of the N antennas 40 located in regions 164-1, 164-2, 164-3, and 164-4 may have radiating elements (e.g., antenna resonating element arms) formed from conductive segments of housing 12 (e.g., peripheral conductive housing structures that run around the lateral periphery of device 10) that are separated/defined by dielectric-filled gaps 162 in housing 12. The antennas formed from conductive portions of housing 12 may also be used to convey cellular telephone data, WLAN data, GPS data, etc. The example of FIG. 12 is merely illustrative. In general, housing 12 may have any desired shape.

The methods and operations described above in connection with FIGS. 1-12 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 1 and 2 may be implemented using hardware (e.g., circuit components, digital logic gates, etc.) and/or using software where applicable.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device operable in an environment that includes an external object, the electronic device comprising:
   a first antenna and a second antenna;
   a first voltage standing wave ratio (VSWR) sensor communicably coupled to the first antenna, the first VSWR sensor being configured to perform a first VSWR measurement using radio-frequency signals transmitted by the first antenna;
   a second VSWR sensor communicably coupled to the second antenna, the second VSWR sensor being configured to perform a second VSWR measurement using radio-frequency signals transmitted by the second antenna;
   one or more processors configured to
      identify a first range from the first antenna to the external object based on the first VSWR measurement,
      identify a second range from the second antenna to the external object based on the second VSWR measurement, and
      identify an angular location of the external object based at least on the first range and the second range;
   a first radio-frequency transmission line coupled to the first antenna, the first VSWR sensor including a first directional switch coupler disposed along the first radio-frequency transmission line; and
   a second radio-frequency transmission line coupled to the second antenna, the second VSWR sensor including a second directional switch coupler disposed along the second radio-frequency transmission line, wherein the first antenna is spatially separated from the second antenna, the first range is different from the second range, and the one or more processors is configured to identify the angular location using a geometric calculation based on the first range and the second range.

2. The electronic device of claim 1, further comprising:
   a third antenna; and
   a third VSWR sensor communicably coupled to the third antenna, wherein the third VSWR sensor is configured to perform a third VSWR measurement using radio-frequency signals transmitted by the third antenna, the one or more processors being further configured to
      identify a third range from the third antenna to the external object based on the third VSWR measurement, and
      identify the angular location of the external object based on the third range.

3. The electronic device of claim 2, further comprising:
   a substrate, wherein the first antenna, the second antenna, and the third antenna are disposed on a substrate.

4. The electronic device of claim 3, further comprising:
   a phased antenna array that includes the first antenna, the second antenna, and the third antenna, wherein the phased antenna array is configured to produce a steerable signal beam.

5. The electronic device of claim 2, further comprising:
   a first substrate, wherein the first antenna and the second antenna are disposed on the first substrate; and
   a second substrate that is separate from the first substrate, wherein the third antenna is disposed on the second substrate.

6. The electronic device of claim 5, further comprising:
   a fourth antenna on the second substrate, wherein the first antenna and the second antenna are disposed along a first axis, the third antenna and the fourth antenna are disposed along a second axis, and the first axis is oriented perpendicular to the first axis.

7. The electronic device of claim 1, wherein the one or more processors is configured to identify the first range by comparing the first VSWR measurement to one or more threshold values.

8. The electronic device of claim 1, wherein the one or more processors is configured to identify the first range by comparing a variation in the first VSWR measurement over time to one or more threshold values.

9. The electronic device of claim 1, further comprising:
a phased antenna array configured to produce a signal beam, wherein the one or more processors is configured to adjust a pointing direction of the signal beam based on the angular location of the external object.

10. The electronic device of claim 1, wherein the one or more processors is configured to identify a user input to the electronic device based on the angular location of the external object.

11. The electronic device of claim 1, wherein the one or more processors is configured to reduce a maximum transmit power level of the first antenna based on the angular location of the external object.

12. An electronic device operable in an environment that includes an external object, the electronic device comprising:
a first antenna and a second antenna;
a first voltage standing wave ratio (VSWR) sensor communicably coupled to the first antenna, the first VSWR sensor being configured to perform a first VSWR measurement using radio-frequency signals transmitted by the first antenna;
a second VSWR sensor communicably coupled to the second antenna, the second VSWR sensor being configured to perform a second VSWR measurement using radio-frequency signals transmitted by the second antenna;
one or more processors configured to
identify a first range from the first antenna to the external object based on the first VSWR measurement,
identify a second range from the second antenna to the external object based on the second VSWR measurement, and
identify an angular location of the external object based at least on the first range and the second range; and
a housing having peripheral conductive housing structures, wherein the peripheral conductive housing structures include a segment extending between dielectric gaps in the peripheral conductive housing structures, and wherein the first antenna has an antenna resonating element arm formed from the segment.

13. The electronic device of claim 12, wherein the second antenna is disposed on a substrate located within the housing.

14. A method for operating an electronic device having a set of antennas, at least one voltage standing wave ratio (VSWR) sensor communicably coupled to the set of antennas, and one or more processors, the set of antennas including at least two antennas and the method comprising:
with the set of antennas, transmitting radio-frequency signals;
with the at least one VSWR sensor, gathering VSWR measurements from the radio-frequency signals transmitted by different antennas in the set of antennas;
with the one or more processors, identifying a plurality of ranges between the set of antennas and an external object based on the VSWR measurements; and
with the one or more processors, identifying an angular location of an external object based on the plurality of ranges between the set of antennas and the external object, wherein identifying the angular location comprises:
performing a geometric calculation based on the plurality of ranges and a predetermined spacing between the different antennas in the set of antennas.

15. The method of claim 14, wherein identifying the angular location comprises:
comparing the plurality of ranges to a lookup table that maps ranges between the set of antennas and the external object to different angular locations.

16. The method of claim 14, further comprising:
with at least one antenna in the set of antennas, transmitting radar signals; and
with the one or more processors, identifying a range between the external object and the electronic device based at least in part on the radar signals transmitted by the at least one antenna in the set of antennas.

* * * * *

UNITED STATES PATENT AND TRADEMARK OFFICE
CERTIFICATE OF CORRECTION

PATENT NO. : 12,181,559 B2
APPLICATION NO. : 17/331504
DATED : December 31, 2024
INVENTOR(S) : Joonhoi Hur et al.

It is certified that error appears in the above-identified patent and that said Letters Patent is hereby corrected as shown below:

On the Title Page

Column 2, Item (57), Line 13, "subsequent communications based," should read -- subsequent communications, --

In the Claims

Column 24, Line 59, "perpendicular to the first axis." should read -- perpendicular to the second axis. --

Signed and Sealed this
Twenty-fifth Day of February, 2025

Coke Morgan Stewart
*Acting Director of the United States Patent and Trademark Office*